April 3, 1928.
E. O. WHEELOCK
SNAP GAUGE
Filed May 15, 1925
1,664,583
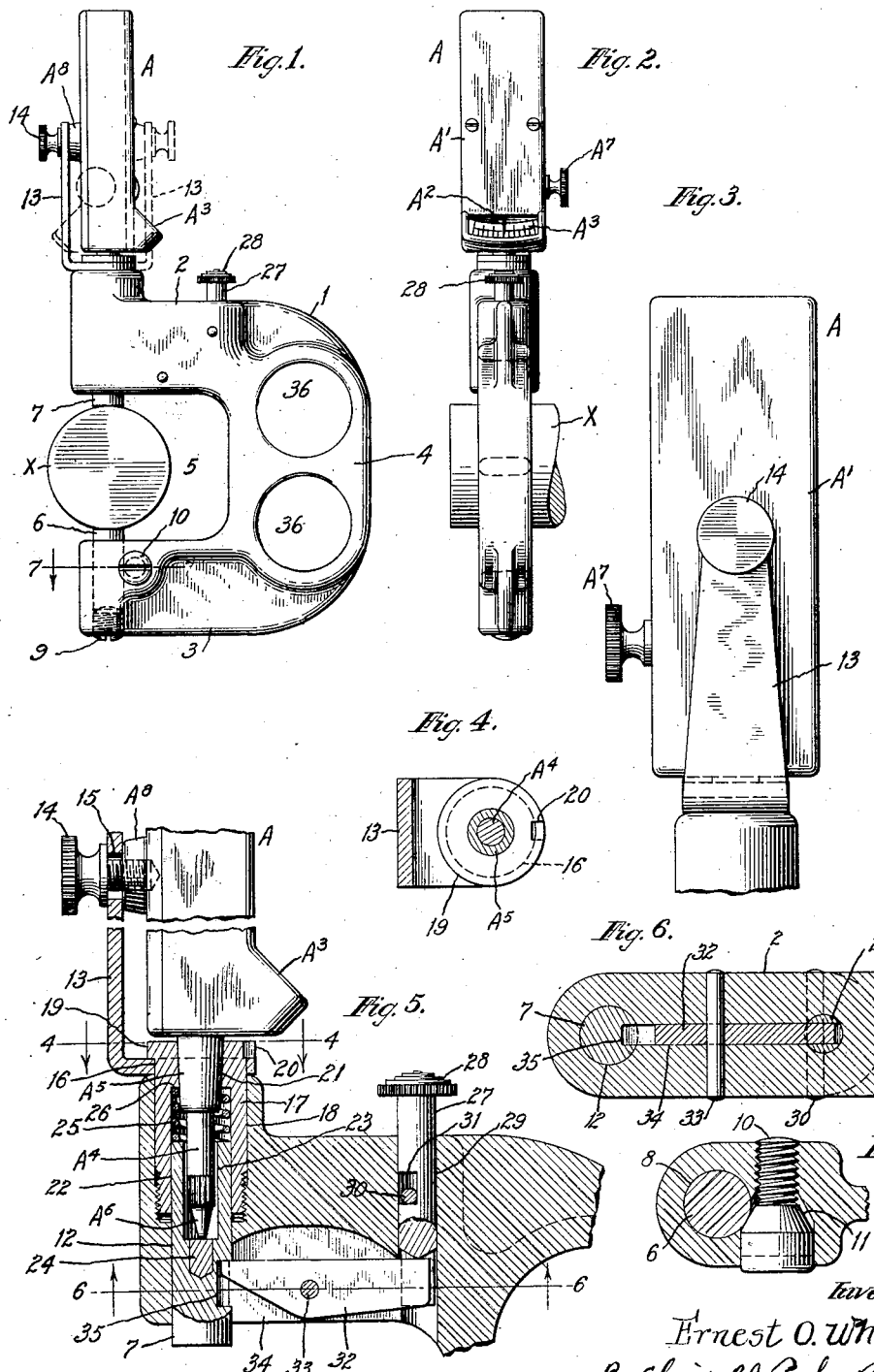
Inventor:
Ernest O. Wheelock,
By Churdahl Parker Carlson
Attys.

Patented Apr. 3, 1928.

1,664,583

UNITED STATES PATENT OFFICE.

ERNEST O. WHEELOCK, OF ROCKFORD, ILLINOIS.

SNAP GAUGE.

Application filed May 15, 1925. Serial No. 30,425.

In an application Serial No. 30,426 executed coincidently with this application and filed on May 15, 1025 (now Patent No. 1,639,321, dated August 16, 1927), I have disclosed a snap gauge comprising a frame carrying contacts to engage the work, an indicating mechanism being built into or enclosed within the gauge frame. The principles of construction and operation of said indicating mechanism are well adapted for use in small, compact, self-contained measuring devices suitable for attachment to a lathe or other machine tool for the purpose of truing up or testing work, and for use in connection with a surface gauge clamp, and other apparatus.

The present application relates more particularly to the combination of such a self-contained measuring and indicating device with a snap gauge.

In the accompanying drawings, Figure 1 is a side elevation of a snap gauge provided with an indicating and measuring device.

Fig. 2 is an edge view of the implement shown in Fig. 1.

Fig. 3 is an enlarged fragmental view of the upper portion of the implement.

Fig. 4 is a section on line 4—4 of Fig. 5.

Fig. 5 is a fragmental sectional view of the implement.

Fig. 6 is a section on line 6—6 of Fig. 5.

Fig. 7 is a section on line 7—7 of Fig. 1.

For the sake of brevity I will herein use the term "testometer" to denote a measuring and indicating device which is complete in itself and which may be attached to various types of fixtures or machines. The form of testometer A herein shown consists of a relatively small oblong casing or body $A^1$ containing an indicating mechanism which, while it may be of any suitable construction, is preferably substantially similar to that fully disclosed in my said Patent No. 1,639,321. The indicating mechanism includes a pointer $A^2$ actuated by a hair spring (not shown) and arranged to swing across a dial $A^3$. Preferably the dial is arranged at an angle of approximately 45° to the body of the testometer in order that readings may be conveniently taken in various positions of the instrument. The testometer also includes a contact plunger $A^4$ (Fig. 5) extending longitudinally of and approximately along the center line of the testometer. The contact plunger is guided in a sleeve $A^5$ on the body $A^1$ of the testometer and projects from one end of the body. A spring (not shown) tends to move the plunger $A^4$ downwardly. The outer end of the plunger $A^4$ is threaded to afford means for attaching a contact point suited to the work in hand, as, for example, the contact point $A^6$, or for making extensions to the plunger. That portion of the contact plunger $A^4$ which is enclosed within the body of the testometer is connected to the pointer $A^2$ by mechanism which may be substantially similar to that fully disclosed in said Patent No. 1,639,321. Any desired means may be provided for manually moving the contact plunger $A^4$. The present drawings show only a portion of such a means, namely, the rotary finger knob $A^7$.

Upon the rear side of the body of the testometer is an internally threaded boss $A^8$ for use in attaching the testometer to any suitable support. As hereinbefore stated, the present drawings show a testometer mounted upon a snap gauge. The snap gauge comprises a body 1 which is of U-shaped form, consisting of the upper arm 2, the lower arm 3 and the connecting arm 4. The space between the arms 2 and 3 constitutes a throatway 5 to receive a gauge block $x$ or an article to be gauged. Two contacts 6 and 7 project into the throatway, the contact 6 being fixed to the arm 3, and the contact 7 being slidably mounted in the arm 2 in alinement with the contact 6. The adjacent ends of the contacts 6 and 7 may be of any suitable form. The contact 6 may be adjustably secured to the arm 3 in any preferred manner. Herein it is shown as mounted in an opening 8 and bearing against an adjusting screw 9 fitting within the lower end of the opening. The contact 6 is rigidly secured in the opening 8 by means of a clamping screw 10 (Fig. 7) having a beveled shoulder 11 arranged to bear against the contact.

The contact 7 is in the form of a plunger slidably mounted in an opening 12 formed in the arm 2 in alinement with the opening 8. Means is provided for attaching the testometer A to the gauge body 1 so that the contact plunger $A^4$ shall be arranged to be moved by the contact plunger 7, the latter forming virtually an extension of the contact plunger $A^4$. The means herein shown for thus attaching the testometer to the gauge body comprises an angular bracket 13 the vertical arm of which is arranged to be clamped against the boss $A^3$ by means of a thumb screw 14 passing through an opening 15 in said bracket arm and engaging said boss. The lower arm of the bracket 13 has a circular opening 16 to receive a sleeve 17 that fits within an opening 18 formed in the arm 2 in axial alinement with the opening 12. On the upper end of the sleeve 17 is a peripheral flange 19 that overlies the lower bracket arm. The inner end of the sleeve 13 has a screw-thread connection with the walls of the opening 18. It will be apparent that the bracket 13 may be rigidly clamped to the gauge body by tightening up the sleeve 17. In the peripheral flange 19 of the sleeve 17 is a notch 20 for engagement by a suitable implement for turning the sleeve.

The upper end of the sleeve 17 is internally tapered to receive the externally tapered sleeve $A^5$. The lower portion of the sleeve 17 has a cylindrical bore 22 to receive the upper portion of the contact plunger 7. Said contact plunger has an axial opening 23 to accommodate the lower portion of the contact plunger $A^4$, the contact point $A^6$ bearing against a hardened plug 24 in the bottom of the opening 23. A coiled expansive spring 25 is enclosed within the opening 22 between the upper end of the contact plunger 7 and an annular shoulder 26 in the sleeve 17. When desired the spring 25 may be replaced with a stiffer or weaker spring according to the character of the work in hand.

The means for manually moving the contact plunger 7 against the action of the spring 25 comprises a plunger 27 having a thumb piece 28, said plunger being slidably mounted in an opening 29 in the arm 1. Movement of the plunger 27 in either direction is limited by means of a pin 30 extending transversely through the arm 2 and through a notch 31 in the plunger. The lower end of the plunger bears against one arm of a lever 32 which is pivoted on a pin 33 within a narrow recess 34 in the arm 2. The other arm of the lever 32 extends into a notch 35 formed in the contact plunger 7 and bears against the upper end wall of said notch.

Two openings 36 are provided in the connecting arm 4 of the gauge body to receive the first and second fingers of the operator's hand. It will be seen that when these fingers are inserted in the openings 36 and the thumb placed upon the thumb piece 28 the gauge may be firmly held even though the operator's hand be oily or wet.

In setting the pointer $A^2$ to zero a standard size block $x$, or the part which it is desired to duplicate, is placed between the contacts 6 and 7, and the contact 6 is adjusted up or down by means of the screw 9 until the pointer $A^2$ is at the zero mark, whereupon the contact 6 is locked in adjusted position by means of the clamping screw 10. By referring occasionally to the standard size block or part used in setting up the gauge, variations due to temperature changes may be detected and allowance made therefor.

To raise the contact plunger 7 preparatory to inserting the piece to be gauged between the contacts 6 and 7, the plunger 27 is depressed, whereby the contact plunger 7 is raised against the influence of the spring 25. When the part to be gauged has been placed between the parts 6 and 7, the operator releases the contact plunger 27, whereupon the spring 25 presses the contact plunger 7 against the piece, the contact plunger $A^4$ following the contact plunger 7 and thus permitting movement of the pointer $A^2$ under the action of its hair spring.

After slightly loosening the sleeve 17 the bracket 13 and the testometer A may be turned to place the dial $A^3$ in the most favorable position for reading graduations thereon, and again clamped in position by means of said sleeve.

It will be seen that the testometer A is a compact self-contained structure which is interchangeable with different gauge bodies, thus permitting one testometer to be used with different sizes of gauges. The means for connecting the testometer to the gauge body is of such character that differently graduated testometers may be used interchangeably.

I claim as my invention:

1. A snap gauge having, in combination, a body provided with a contact, a contact plunger slidably mounted in said body, a sleeve having a screw-thread connection with the body, the contact plunger extending into said sleeve, a coiled expansive spring within said sleeve and bearing against said contact plunger to move it toward said contact, a testometer having an externally tapered sleeve which fits within a correspondingly tapered opening in the sleeve in alinement with the contact plunger, said testometer comprising a contact plunger mounted in the second-mentioned sleeve and extending into position for engagement by the first contact plunger, and an angular bracket one arm of which has an opening through which the first-mentioned sleeve extends, said sleeve having a flange overlying said bracket arm whereby the bracket may be clamped to the gauge body by means of the first-mentioned sleeve, said testometer being detachably secured to the other arm of said bracket.

2. A snap gauge having, in combination, a body provided with a contact, a contact plunger slidably mounted in said body, a sleeve alined with said plunger and having a screw-thread connection with the body, a coiled expansive spring within said sleeve and bearing against said contact plunger to move it toward said contact, a testometer detachably connected to said body and having a sleeve which fits within an axial opening in the first sleeve in alinement with the contact plunger, said testometer comprising a contact plunger mounted in the second-mentioned sleeve and extending into position for engagement by the first contact plunger.

3. A snap gauge having, in combination, a body provided with a contact, a contact plunger slidably mounted in said body, a spring bearing against said contact plunger to move it toward said contact, a testometer detachably connected to the body, said testometer comprising a contact plunger alined with the first mentioned contact plunger and extending into position for engagement by said first contact plunger, a digitally operable member carried by the body, and means connecting said member to the first contact plunger for moving both contact plungers against the influence of said spring.

4. A snap gauge having, in combination, a body provided with a contact, a contact plunger slidably mounted in said body, a spring bearing against said contact plunger to move it toward said contact, a testometer detachably connected to the body and comprising a contact plunger alined with and extending into position for engagement by the first contact plunger, and means engaging the first contact plunger for manually moving both plungers.

In testimony whereof, I have hereunto affixed my signature.

ERNEST O. WHEELOCK.